Since grind stone 34 may need to be moved as little as an eighth of an inch to effect a considerable change in the angle of slope or taper applied to the drill bit being sharpened, it may also be possible to accomplish the small amount of angular change required for adjustment for drills of varying taper by swinging left and right end plates 26 and 27 forward or backward with respect to pivot studs 51—51 as illustrated in FIG. 9 and FIG. 10 of the drawings herein. In the case of such pivoted alternate arrangement, end plates 26 and 27 would be secured in place after adjustment by tightening securing means 47 such as the wing nut securing means 47 as illustrated in the drawings.

OPERATION

In operation the craftsman removes said drill bit sharpening apparatus from his tool kit or from the accustomed storage place and selects a suitable drill bit holding chuck 19 for the size of drill bit 23 to be sharpened. Said drill bit 23 is inserted into tubular drill bit receiving opening 22 in chuck 19 and chuck 19 is inserted into one of the plurality of chuck receiving guideways 16—16. Said chuck 19 is lowered into position until one of the cam shaped bearing ramp ways 41 rests inside horizontal recessway 40 in the shoulder of drill holding chuck 19. Drill bit 23 is then rotated inside opening 22 until the cutting end of drill bit 23 comes into contact with angularly positioned rotary grind stone 34 in the manner described in the body of the specification above. With drill bit 23 properly aligned and adjusted into place as described, electric hand drill 33 is attached to coupling extension shaft from axle 32 as illustrated in FIG. 1 of the drawings and power is applied to secure rotary drive motion from said hand drill 33 to rotate grind stone 34 which in turn grinds one of the two faces of drill bit 23. When said face of drill bit 23 has been properly sharpened and the trailing taper of associated heel 39 has been ground by rotating drill holding chuck 19 as explained above, then drill chuck holder 19 is lifted and rotated by 180 degrees until stop recessway 40 sits over cam bearing ramp 41 when the previously described procedure is repeated to grind and sharpen the second face of drill bit 23. When both faces of drill bit 23 have been properly ground and sharpened the sharpening process is complete and the apparatus is available for sharpening of other drill bits — or for returning to storage.

ADVANTAGES OF THE INVENTION

In the foregoing description of the structure and operation of the invention set forth herein, a number of advantages have been claimed for the apparatus and others will be readily apparent to persons skilled in the art.

A primary advantage of this invention is that it devises a twist drill bit sharpening device of such compactness and such portability that it can be held in the workman's hand during usage and of sufficient compactness to permit the device to be stored and transported in a small corner of the workman's tool kit.

Another advantage of the invention is that it provides a compact and portable drill bit sharpening device in which a drill bit chuck holder structure together with a guide block provided with a plurality of chuck receiving pilot guideways that automatically hold a twist drill bit mounted therein in such position as to be in proper angular alignment with respect to a self-contained rotary grind stone as to permit accurate sharpening of the two angularly disposed drill bit cutting surfaces.

A further advantage of the Invention is that is devises a compact portable drill bit sharpening device provided with its own builtin rotary grind stone in which the builtin rotary grind stone is held in proper angular grinding position with respect to the drill.

A further advantage of the invention is that it provides a compact and portable drill bit sharpening device in which the motive power for the rotary grind stone can be provided by attachment of any suitable hand drill including conventional electrical hand drills and the recently popularized battery electric hand drills which will make it convenient and practical to sharpen twist drill bits on the job and at locations remote from regular power facilities with all of the equipment including the motive power requirements being completely portable.

A still further advantage of the invention is that it provides a reliable and field adjustable means for adjusting the angle of interaction between the rotatable grind stone and the positioned drill bit to be sharpened.

A still further advantage of the invention is that it provides reliable guide and stop means which will permit the operator to accurately sharpen one drill bit surface at a time with accuracy and then to rotate the drill bit by 180° to accurately sharpen the second drill biting surface.

Another advantage of the Invention is that it provides a simple and reliable means by which the heel area of the drill bit can be proportionately ground back during the same operation in which the cutting faces of the drill bit are sharpened.

Although this specification describes but a single embodiment of the Invention with certain applications thereof, it should be understood that structural or material rearrangements of adequate or equivalent parts, substitutions of equivalent functional elements and other modifications in structure can be made and other applications devised without departing from the spirit and scope of my invention. I therefore desire that the description and drawings herein be regarded as limited only as set forth in the following claims, or as required by the prior art.

Having thus described my invention, I claim:

1. A compact, portable, hand-held drill bit sharpening device comprising:
   A. a specially shaped trapezoidal guide block having
      1. a plurality of spaced apart chuck receiving pilot guideway channels drilled through one plane of said guide block, and
      2. a plurality of stop pins mounted in the upper surface of said guide block;
   B. a plurality of cylindrical, sized drill bit holding chucks adapted to rotatably fit into said guideway channels in the guide block,
      1. provided with a central drill bit receiving tubular passageway running through the length of said drill holding chuck, and
      2. provided with stop recesses in each drill holding chuck adapted to engage with the stop pins provided in said guide block;

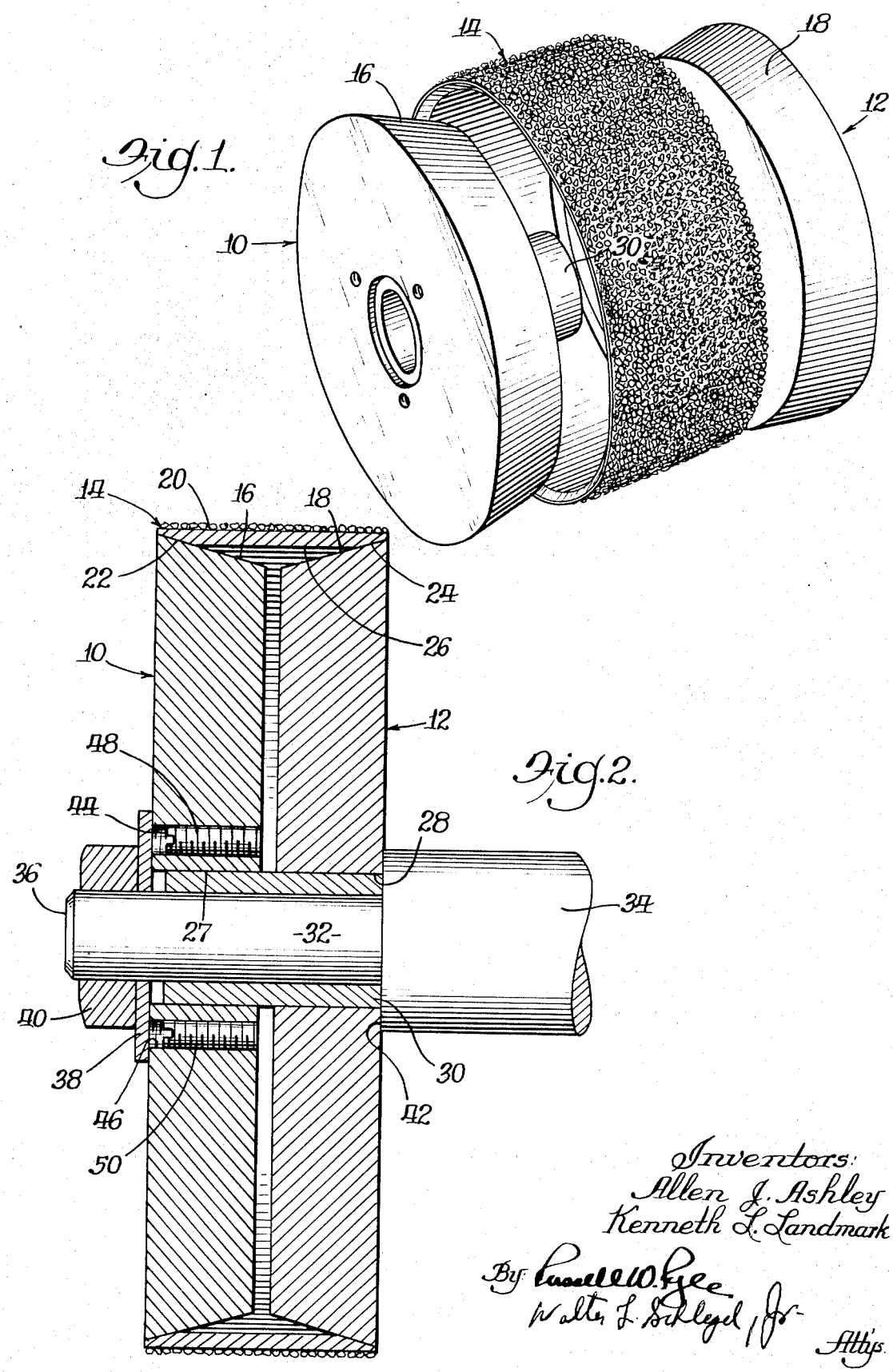

MODULAR ABRASIVE WHEEL ASSEMBLY

This invention relates to abrasive grinding wheels and more particularly to a peripheral grinding wheel having a replaceable band coated with crushed tungsten carbide.

In the past, grinding wheels coated with tungsten carbide have been provided in solid form, such as a solid machined steel wheel coated on its outer periphery with tungsten carbide particles. Upon wearing away of the abrasive, the entire wheel would be returned to the manufacturer for re-coating. Such wheels were sometimes found to have short service life because of poor heat dissipating qualities.

Accordingly, an object of this invention is to provide an abrasive wheel assembly having an easily replaceable abrasive part and good heat dissipation qualities.

Other objects will become apparent from the following description and claims, taken in connection with the accompanying drawing, wherein:

FIG. 1 is a perspective view of the abrasive wheel assembly, shown disassembled; and FIG. 2 is vertical sectional view of one version of the assembled wheel assembly.

Referring to FIGS. 1 and 2, which show a preferred embodiment of the present invention, the assembly principally comprises a pair of opposed hubs 10 and 12 upon which a cylindrical band 14 is mounted. The hubs are slightly spaced from one another to provide an air gap therebetween and are preferably composed of aluminum, which acts as a heat sink to accommodate the extreme heat generated during operation of the assembly. The hubs 10 and 12 comprise respective outer frusto-conical surfaces 16 and 18, which diverge outward from one another to substantially define a V-shaped profile. Preferably, the surfaces are machined to be tapered at about 15° from normal, although an angle of 15° to 45° is acceptable.

The band 14 is a unitary member composed of steel with the outside surface 20 thereof being coated with an abrasive material, such as crushed tungsten carbide. The particle size of the tungsten carbide is in the order of 16 to 240 mesh, and the abrasive material is bonded to the band with copper bonding agent in a high temperature furnace with a controlled atmosphere. The inside diameter of the band 14 comprises a pair of spaced outward beveled surfaces 22 and 24 at the respective sides of the band, said beveled surfaces being connected by a cylindrical surface 26 that is parallel to the outer surface 20 of the band. The beveled surfaces 22 and 24 of the band contact or frictionally engage the respective surfaces 16 and 18 of the hubs 10 and 12, said beveled surfaces being tapered to the same degree as the respective frusto-conical surfaces engaged on the hub.

It will be noted that, in order to provide for efficient heat dissipation, the band 14 is in contact with the hubs 10 and 12 only at the sides of the assembly along the beveled surfaces 22 and 24, and the inner central cylindrical surface 24 is spaced from said hub. This feature of limited contact between the sleeve and the hub also facilitates removal of the hubs from the band after prolonged use. It has also been found that the thickness of the band should not exceed about three-sixteenths of an inch because a thicker band would not properly align or true up between the hubs.

The assembly contains means which allow the mounting of the assembly upon driven machine arbors of various diameters. The hubs 10 and 12 are provided with respective aligned circular apertures 27 and 28 in which a single bushing 30 is mounted, said bushing being shorter than the width of the assembly. The bushing may be selected from an appropriate thickness such that the inner diameter thereof matches the diameter of the reduced diameter mounting end 32 of the machine arbor 34. The extreme end 36 of the arbor 34 is normally threaded to receive a washer 38 and a nut 40 secured against one side of the assembly, with the other side abutting a shoulder 42 on the arbor. Tightening of the nut 40 urges the hubs 10 and 12 toward one another, thereby expanding the frusto-conical surfaces 16 and 18 against the band 14, which automatically aligns and secures the band with respect to the assembly.

Since it has been found that the band sometimes becomes stuck on the hubs, means may be provided to forcibly separate the hubs axially to facilitate installation of a new band. For this purpose, one or more threaded apertures, such as 44 and 46, are provided in one of the hubs 10, and an inset set screw 48 and 50, respectively, is provided in each aperture. The apertures are preferably parallel to the axis of the assembly and are located near the central aperture 27 of the hub. The washer 38 is of sufficient diameter to cover the apertures when the assembly is mounted on the arbor. The set screws 48 and 50 may be screwed inwardly against the other hub 12 to cause the hubs to separate. Alternatively, a single air valve (not shown) may be employed to enable separation by the use of air pressure.

Having thus described the invention, what is claimed is: covering

1. A modular abrasive wheel assembly adapted for mounting on a driven arbor, said arbor having shoulder means spaced from the end thereof and having a nut threaded on said end, said assembly comprising a pair of opposed spaced cylindrical aluminum hubs, a frusto-conical surface on the outer periphery of each hub, said frusto-conical surfaces presenting a V-shaped profile in assembly, a separate unitary steel band around said hub, a coating of crushed tungsten carbide on the outer periphery of said band, a pair of spaced beveled surfaces on the inside diameter of said band, said beveled surfaces matching and engaging respective frusto-conical surfaces of said hubs near the sides of said assembly, an inner cylindrical surface connecting said beveled surfaces and being entirely spaced from said hubs, aligned central apertures through the sides of said hub, a bushing received in said apertures and mounted on said arbor, a plurality of threaded apertures through one of said hubs, a tap screw in each of said apertures, and a washer between said nut and said one hub, said washer covering said apertures.

2. A modular abrasive wheel assembly comprising a pair of opposed hubs, said hubs being spaced from one another to provide an air space therebetween, each hub having a frusto-conical outer periphery such that the hubs together present a V-shaped profile in the assembly, a unitary band around said hub, said band having a pair of spaced beveled inner surfaces engaging respective frusto-conical surfaces of said hubs at the sides of said assembly, a cylindrical inner surface connecting said beveled surfaces and spaced from said hubs, a coating of abrasive material on the outside surface of said band, and means within one of said hubs for forcing said hubs apart including a plurality of threaded apertures through the side of one of said hubs, and screws in said apertures, said screws being engageable with the other of said hubs.

3. A modular abrasive wheel assembly comprising a pair of opposed hubs, said hubs being spaced from one another to provide an air space therebetween, each hub having a frusto-conical outer periphery such that the hubs together present a V-shaped profile in the assembly, a unitary band around said hub, said band having a pair of spaced beveled inner surfaces engaging respective frusto-conical surfaces of said hubs at the sides of said assembly, a cylindrical inner surface connecting said beveled surfaces and spaced from said hubs, a coating of abrasive material on the outside surface of said band, said hubs having aligned central axial apertures therein, a bushing removably mounted in said apertures, said busing being shorter than the width of said assembly, and means within one of said hubs for forcing said hubs apart.

4. The modular abrasive wheel assembly of claim 3 wherein said band is no thicker than about three-sixteenths of an inch and said hubs are composed of aluminum.

* * * * *